United States Patent [19]

Off et al.

[11] Patent Number: 4,910,672

[45] Date of Patent: * Mar. 20, 1990

[54] METHOD AND APPARATUS FOR DISPENSING DISCOUNT COUPONS

[75] Inventors: George W. Off, Huntington Beach; Michael C. Scroggie, Valencia, both of Calif.; Thomas L. Mindrum, Fairfield, Conn.; Michael R. O'Brien, Santa Monica, Calif.

[73] Assignee: Catalina Marketing Corporation, Anaheim, Calif.

[*] Notice: The portion of the term of this patent subsequent to Feb. 2, 2005 has been disclaimed.

[21] Appl. No.: 129,113

[22] Filed: Dec. 4, 1987

Related U.S. Application Data

[63] Continuation-in-part of Ser. No. 20,164, Feb. 2, 1988, Pat. No. 4,723,212, which is a continuation of Ser. No. 631,831, Jul. 18, 1984, abandoned.

[51] Int. Cl.⁴ .................... G06F 15/21; G06K 19/00
[52] U.S. Cl. .................................. 364/405; 235/383; 235/487
[58] Field of Search ............. 364/401, 405, 478, 479; 340/825.35; 235/381, 382, 385, 487, 493, 494; 283/51, 56

[56] References Cited

U.S. PATENT DOCUMENTS 4,723,212  2/1988  Mindrum et al. .................. 364/401

Primary Examiner—Joan H. Pendegrass
Attorney, Agent, or Firm—Noel F. Heal

[57] ABSTRACT

A system for creating discount coupons in response to the purchases of products. Improvements disclosed include the printing of a "negative" coupon in response to the failure to purchase a particular product, and the printing of a coupon in response to the purchase of multiple triggering items, either without limitation as to the identification of the items, or with the requirement that the items fall into a predefined trade group. Other features of the invention permit the use of instantly redeemable "coupons," such that an instant discount is applied to a customer bill rather than having a coupon printed, and the logging, without printing, of possible coupon printings for statistical purposes.

4 Claims, 6 Drawing Sheets

METHOD AND APPARATUS FOR DISPENSING DISCOUNT COUPONS

CROSS-REFERENCE TO RELATED APPLICATION

This is a continuation-in-part of application Ser. No. 07/020,164 Feb. 2, 1988, U.S. Pat. No. 4,723,212, which is a continuation of Ser. No. 631,831, July 18, 1984, abandoned entitled "Method and Apparatus for Dispensing Discount Coupons.".

BACKGROUND OF THE INVENTION

This invention relates generally to point-of-sale computer systems of the type used in retail stores to record sales transactions. More particularly, the invention relates to point-of-sale systems capable of handling discount coupons. Most point-of-sale systems have terminals that are capable of reading a code printed on each product package, and thereby determining the price from an internal file stored at a store controller. Products are coded by means of a series of parallel lines, in accordance with a convention known as the Universal Product Code.

As every grocery shopper knows, many manufacturers distribute discount coupons for their products, either through the mail, or by printing them in newspapers or magazines, or enclosing them in similar or related product packages. When a customer presents a discount coupon at the time of purchase of an appropriate product, the grocery checker operating the terminal will typically key in the coupon amount, and the discount will be subtracted from the customer's bill.

This procedure often has the disadvantage that the customer may not have actually purchased the discountable product, and the coupon will then be improperly redeemed. There is, however, a more important disadvantage associated with the usual system of discount coupon distribution. The coupons for a particular product are distributed either to a person who has previously bought the same or a related product. From a marketing standpoint, this is contrary to the usual goal in any marketing campaign: to increase the number of customers who buy a particular product, by adding new customers. People who have already bought the product are clearly not new customers. And people who collect coupons from newspapers and mailings typically fall into a very narrow group. First they are part of a group of people who are motivated to collect coupons of any kind, usually for economic reasons. More importantly, customers who collect and redeem a particular coupon will usually have had some prior knowledge of the product, i.e. they are probably not "new" customers.

Various other strategies are sometimes used to reach new customers. These include mass mailings of free samples of the product, together with discount coupons, and mass media advertising. Free samples of some types of products cannot be conveniently mailed, however, and many potential new customers may still ignore the mailing. Likewise, mass media advertising may fail to reach a potential new customer, or convince him to try a new product, especially if he is already relatively satisfied with a competitive product.

Ideally, what is needed from a marketing standpoint is some way of putting a discount coupon for a selected product in the hands of a customer who uses some other product. The cross-referenced application presented a basic solution to this problem. The present invention relates to a number of improvements over this basic solution that were not claimed or completely disclosed in the cross-referenced application.

SUMMARY OF THE INVENTION

The present invention has additional features not disclosed in the cross-referenced application. There are four such features, including "negative" coupons, multiple-trigger coupons, log-only operation, and instantly redeemable discounts.

A "negative" coupon is printed in response to the failure of a customer to purchase a selected trigger item. Multiple-trigger coupons are those that require the purchase of more than one triggering item in a single transaction. One category of multiple-trigger coupons is the "heavy-user" type, in which a customer who purchases multiple items is rewarded with a discount coupon, the value of which is selected to be dependent on the total number of items purchased. Another category of multiple-trigger coupons is termed a "trade event" coupon, the printing of which is conditioned on the customer's having purchased multiple items in a predefined trade group of products. The trade groups may be defined by a product manufacturer or by the store. The log-only feature, which was also disclosed in the cross-referenced application, allows a store or a product manufacturer to define a coupon deal but to suppress printing so that statistics can be gathered on the number of coupons that would be printed if the deal were to be activated.

Briefly, in relation to the negative coupon printing feature, the system of the invention includes a plurality of terminals at customer checkout locations, each having means for reading product codes on purchased items in a customer order, a store controller with which the terminals can communicate, the store controller having access to an item record file containing price and other information for each product item, means for storing the terms of at least one coupon deal in which the printing of a discount coupon for a selected product will be triggered by the failure to purchase at least one triggering product, means for identifying triggering products in the customer order, means for associating triggering products with the coupon deal, and means for automatically printing at least one discount coupon, based on the details of the coupon deal and without the intervention or participation of the customer other than in failing to purchase triggering products.

Optionally, the printing of the discount coupon can be conditioned on an additional factor, such as the purchase of a threshold number of items or a threshold dollar amount in the customer order.

The system of the invention as it relates to multiple-trigger coupons includes most of the same elements. However, the printing of a discount coupon is conditioned on the purchase of multiple triggering products. In the simplest case, the multiple triggering products are not necessarily related in any way. The total number of items is used to determine the type of coupon deal that applies to a particular customer order. In a different arrangement, the triggering items are grouped in some fashion, such that multiple items in a single group must be purchased in order to trigger the coupon deal. When multiple-trigger coupon deals are involved, coupon printing is delayed until the end of the purchase transaction, at which time it is possible to determine whether a required number of multiple triggering products have been purchased. If so, an appropriate coupon is printed, the terms of which may depend on the total number of items purchased, or other selected factors.

In the log-only or "blind coupon" mode of operation of the invention, the system operates in practically the same manner as described in the cross-referenced application, but no coupon is ever printed. Instead, a log is maintained of the coupons that would have been printed if printing had been activated.

When the system operates to produce an instantly redeemable "coupon," no coupon is actually printed, and a discount is applied to the total purchase price at the end of the transaction. This feature may be used in conjunction with the purchase of multiple triggering products, to provide an instant reward to the "heavy user" customer, without the necessity of another visit to the store to redeem a coupon, and without the inherent store problems associated with redemption of coupons.

It will be appreciated from the foregoing that the present invention represents a significant advance in the field of retail point-of-sale systems. In particular, the invention provides a technique for creating discount coupons at the point of sale and in response to the sale of single or multiple products, or to the non-purchase of selected items. The invention also provides for logging of possible discount coupons, without printing them, and for applying an instant discount without the need for printing and redeeming a coupon. Other aspects and advantages of the invention will become apparent from the following more detailed description, taken in conjunction with the accompanying drawings.

DESCRIPTION OF THE PREFERRED EMBODIMENT

Overview

Figure 1:
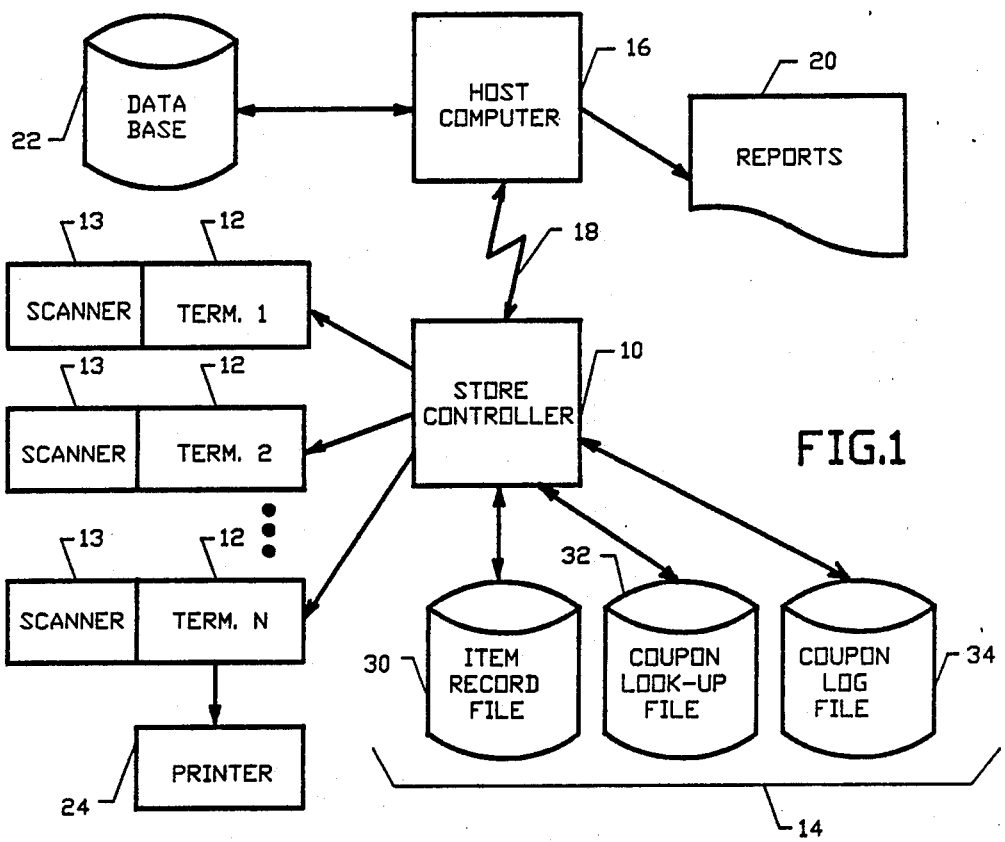
FIG. 1 is a simplified block diagram showing the apparatus of a point-of-sale computer system for use in a retail store.

As shown in the drawings for purposes of illustration, the present invention is concerned with point-of-sale systems for recording sales transactions involving discount coupons. FIG. 1 shows in broad outline the components of such a system. In each store in which the invention is to be used, there is a store point-of-sale controller, indicated by reference numeral 10, and a plurality of checkout terminals 12, each having an associated optical scanner 13. Associated with the store controller 10 are a number of files, indicated at 14, which are used by the controller to provide information to the terminals 12. In a typical point-of-sale system, the files 14 contain a record for each product in the store, and are used to access price and other information concerning the product.

The store controller 10 is coupled to a retailer host computer 16, as indicated by line 18, which may be a telephone line or some other communication link. The retailer host computer 16 controls communications with all store controllers in the retailer's various stores, and is responsible for generating various accounting reports, as indicated at 20. The retailer host computer 16 has an associated data base 22 of various files relating to the retailer's entire store operations.

Point-of-sale systems of the general type described are not normally equipped to handle discount coupons, except in the sense that a checker at one of terminals 12 can key in coupon values to be discounted from a customer's bill. In accordance with the present invention, at least one of the checkout terminals 12 has associated with it a coupon printer 24, and the system includes means, to be described, for identifying a triggering product among the items listed in the customer's bill. A triggering product is one that has been selected by a manufacturer to trigger the printing of a coupon for one of the manufacturer's products.

The files 14 associated with the store controller 10 include an item record file 30, a coupon look-up file 32, and a coupon log file 34. The item record file 30 is a standard price file used in point-of-sale systems, except that it includes a trigger flag, which is an additional one-bit field. There is also room in the item record for two fields known as family group codes. A family group code is a three-digit number assigned by the product manufacturer to identify the product as belonging to a particular group of products. A single product may belong to two such groups, or more if an extended record format is used. As will be discussed in more detail, the family group codes are used in the coupon validation process, in which a coupon presented for redemption is examined for validity in relation to a particular customer bill. For example, a particular coupon may be valid for a family group comprising all different sizes of a product package.

Figure 2:
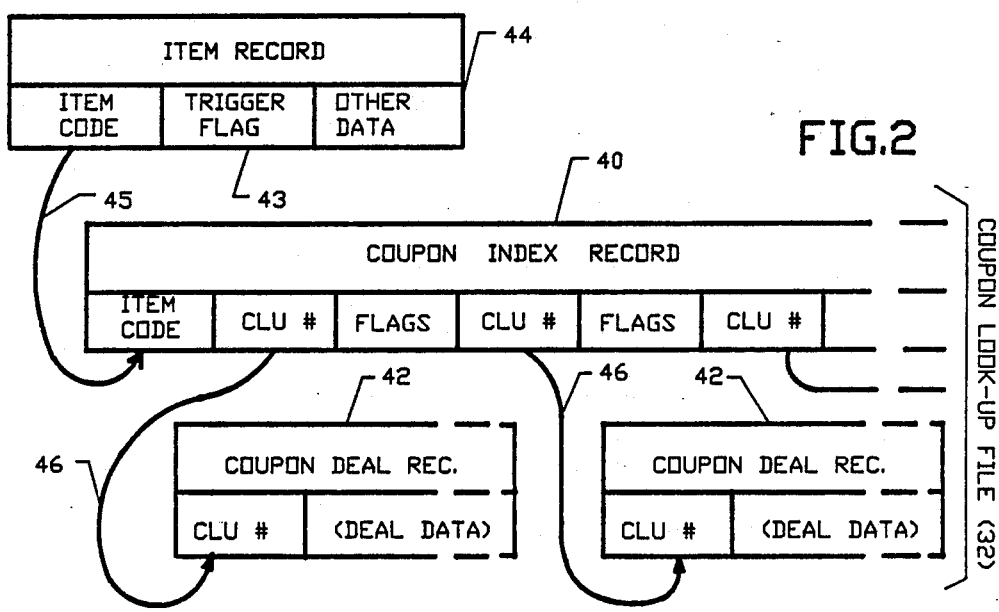
FIG. 2 is a block diagram illustrating interrelationships between the principal files used in the apparatus of the invention.

In the process of coupon creation, the files 14 are used as illustrated in simplified form in FIG. 2. The coupon look-up file 32 includes records of two types, coupon index records, indicated at 40, and coupon deal records, indicated at 42. When a product in the customer's purchase transaction is detected as a triggering item, by detection of the trigger flag 43 in the item record 44 for that product, the system is able to locate a coupon index record corresponding to the triggering product, as indicated by the arrow 45. The coupon index record 40 contains an item code, i.e. there is a unique coupon index record for every triggering product, and also contains at least one coupon look-up number (CLU). The CLU provides a link to at least one coupon deal record 42, as indicated by the arrows 46. This structure allows a particular triggering product to trigger the printing of one or more coupons, which may pertain to different groups of products, and allows different triggering products to trigger the printing of a coupon for a single product group. Each coupon deal record 42 contains the details of a particular coupon deal, including the value of the discount, the dates of validity of the deal, a message to be printed on the coupon, and various counts recording the activity of the coupon deal.

Validation of a coupon presented for redemption involves first reading a coupon look-up number from the coupon. This number relates the coupon to a specific coupon deal record, which has as one of its data fields a manufacturer's number and a family code. If the manufacturer's number and the family code match with similar fields for an item in the customer's order, the coupon is valid, and an appropriate discount is applied to the order.

File Formats

The coupon look-up file includes two types of record: the coupon index record (CIR) and the coupon deal record (CDR). Both types of record begin with a six-byte key in the following format:

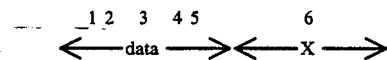

The X field indicates the record type. If X=00 the record is a coupon index record, and if X =01 the record is a coupon deal record. The five-byte data field is different for each of the two record types, as will be apparent from the following formats. The coupon index record format is as follows:

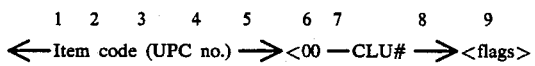

The item code contains the Uniform Product Code for the product, in binary form. The sixth byte identifies the record as a coupon index record. And the CLU# provides a link between a triggering product and a particular coupon deal record. To allow the purchase of one product to trigger more than one coupon deal, a coupon index record may contain up to two additional CLU# fields and flag fields, following the format illustrated above. Accordingly, the purchase of one product can trigger the printing of up to three coupons.

The individual bits in the flag field of the coupon index record have the following meanings, where bit 7 is the most-significant bit and bit 0 is the least-significant bit:
Bit 7—Log only (print inhibited),
Bit 6—High priority coupon,
Bit 5—Minimum balance due applies,
Bit 4—Trigger bit,
Bits 3-0—Trigger item sequence no. (1-9).

The trigger bit is a copy of the trigger bit contained in the item record. However, the item record may have its trigger bit reset during routine maintenance, and the trigger bit in the coupon index record are copied back into the item records on a regular, such as daily, basis. The log-only flag is used to inhibit printing, and may be used to monitor the number of coupons that would have been created by the use of a particular triggering product. The high-priority flag enables coupon printing immediately upon detection of the triggering product in a customer's order. For a low priority coupon, printing is deferred until the entire order ha been processed. The flag relating minimum balance due permits printing to be inhibited unless a minimum balance due is reached in the customer order. Finally, the trigger item sequence number is a digit that can be used to identify the triggering product in cases where the same coupon deal is triggered by the purchase of different products. The trigger item sequence number is printed on the coupon that is created, and may therefore be used upon redemption of the coupon, to create an appropriate log record permitting analysis of which triggering items resulted in coupon-discounted sales.

It will be noted that the coupon index record has a length of from nine to fifteen bytes. The trigger flag in the first flag byte of the record is the only one used. i.e., the trigger bits in flag bytes for any additional CLU's are not used. The CLU# field may be zeroed out to denote that the triggering product is no longer linked to a particular coupon deal.

Each coupon deal record contains the details of a coupon to be printed. The format is as follows:

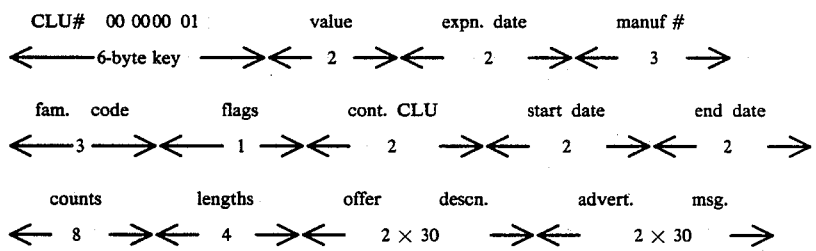

The value field contains the coupon discount amount, and the manufacturer's code is a number that uniquely identifies the manufacturer of the products for which the coupon provides a discount. Each coupon deal relates to a discount on any of a family of products, the family codes being assigned by the manufacturer. A discount could apply, for example, to all sizes of a product, or to any group of related products.

The expiration date contains a number indicative of the date of expiration of the coupon. This can be a validity period in days from the coupon printing date, or the number of days from some fixed time reference, such as Jan. 1, 1983. The start and end dates are also measured in numbers of days from the same reference, modulo 1000, and indicate the period during which the coupon deal extends, i.e. the period during which coupons will be printed.

The continuity CLU field defines another coupon deal that is linked to this one. This can be used to trigger the printing of another coupon when the original one is redeemed. The field is zero if there is no such linked coupon deal. The "lengths" fields are four one-byte fields, each defining the length of one line of text in the offer description and the advertising message that follow.

The "counts" fields are four separate two-byte fields to record counts of the total number of coupon triggered, the total number of coupons printed, the total number of coupons redeemed, and the total number of coupons misredeemed. The counts are used for purposes of analysis of coupon usage, both in the coupon creation and coupon redemption phases.

The flag field of the coupon deal record contains only three meaningful bits of information. Specifically, the flag bits have the following meanings when set to a one state:

Bit 7—log only (print inhibited),
Bit 6—free coupon (no charge for item),
Bit 5—expiration date is a validity period.

When bit 5 is set, the expiration date indicates the number of days beyond the printing date that the coupon is to remain valid. If bit 5 is not set, the expiration date indicates the number of days beyond a preselected reference date that the coupon is to remain valid.

The coupon log file is a sequential file into which a new record is written whenever a coupon is printed or a coupon is redeemed. The format of the log file record is as follows:

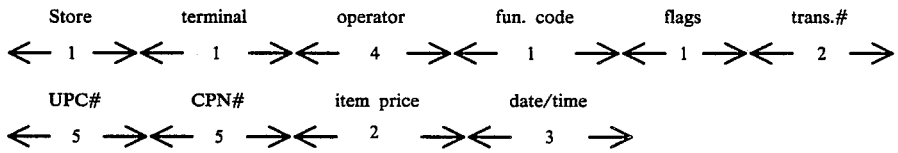

The store number field contains a relative store number. A value 01 indicates a local store and a value 02 indicates a backup store. This code is not critical to the invention, and relates to the use of a back-up store controller (at another store) to control check-out operations. The terminal number indicates the check stand at which the transaction took place. The function code field has the following possible meanings:

| F1 (hexadecimal) | coupon creation, |
| F2 | redemption, |
| F3 | store support procedure entry. |

The flags field has the following meanings:

| 80 (hexadecimal) | free coupon, |
| 40 | no-sale redemption, |
| 20 | continuity linked (if creation), or coupon value entered manually (if redemption), |
| 10 | voided redemption, |
| OF | reason code. |

The low four bits of the flag field are used to record a reason for non-printing or misredemption of a coupon.

The various reasons are as follows, where the four-digit value represents the binary state of the field.

A. Coupon printing:
0000—printed,
1000—print inhibited store-wide,
1001—print inhibited at this lane,
1010—print inhibited for this CLU#,
1011—print inhibited for this item,
0100—unable to access coupon index record,
0101—unable to access coupon deal record,
0010—transaction below threshold,
0001—duplicate CLU#,
1100 printing disabled by operator.

B. Misredemption:
0000—normal redemption,
0001—item not in order,
0010—expiration date exceeded,
0100—match only in manufacturer number,
1000—accepted (validation disabled).

The date/time of the transaction are recorded in the form MMDDHH, where MM is the month, DD the day of the month, and HH the hour of the day. The CPN# field is used to record the entire set of data read from a printed coupon, and the UPC# field records the triggering product code in the case of coupon creations, and the purchased product code in the case of redemptions.

Hardware and Software Overview

The hardware used in this invention is conventional for point-of-sale systems. Various manufacturers supply point-of-sale equipment, and the invention is not limited to any particular configuration. By way of example, the invention is presently implemented using the International Business Machines Corporation (IBM) Programmable Store System, referred to as the IBM 3680. The store controller 10 is an IBM 3650 and the terminals 12 are IBM 3683 terminals. The IBM 3683 Model 3 terminal incorporates a third printer station in addition to a customer receipt printer station, and a journal printer station 16 for maintaining a log of transactions.

IBM supplies a software operating system for use in controlling operations in the hardware described. The operating system is referred to as the IBM programmable store system MICROCODE, sometimes referred to as the general control program. IBM also supplies a program product to enable users to write programs for execution in the controller and the terminals. The program product is referred to as SPPS II (Subsystem Program Preparation Support II), and includes languages, macro instructions, and a terminal display language. Communication between the terminals and the store controller is accomplished using a store communications loop and a program of instructions written in IBM 3650 Programmable Store System Microcode. Other application programs that typically form part of the environment of the invention are SDM (Store Data Management) and HCP (Host Communication Program), both sold by IBM.

All of these aspects of the invention hardware and software are well known and well defined in trade literature and IBM technical literature. For further information, a useful starting point is the publication "IBM 3680 Programmable Store System Introduction," (GA27-3199-3) published by IBM, Dept. E02, P.0. Box 12195, Research Triangle park, N.C. 27709.

An application program product written to run in the SPPS II environment provides various checkout and administrative functions for the store. This product is referred to as ISIS (In-Store Information System), produced by Data Connection Limited, Enfield, Middlesex EN2 6UE, England.

Coupon Creation

Figure 3:
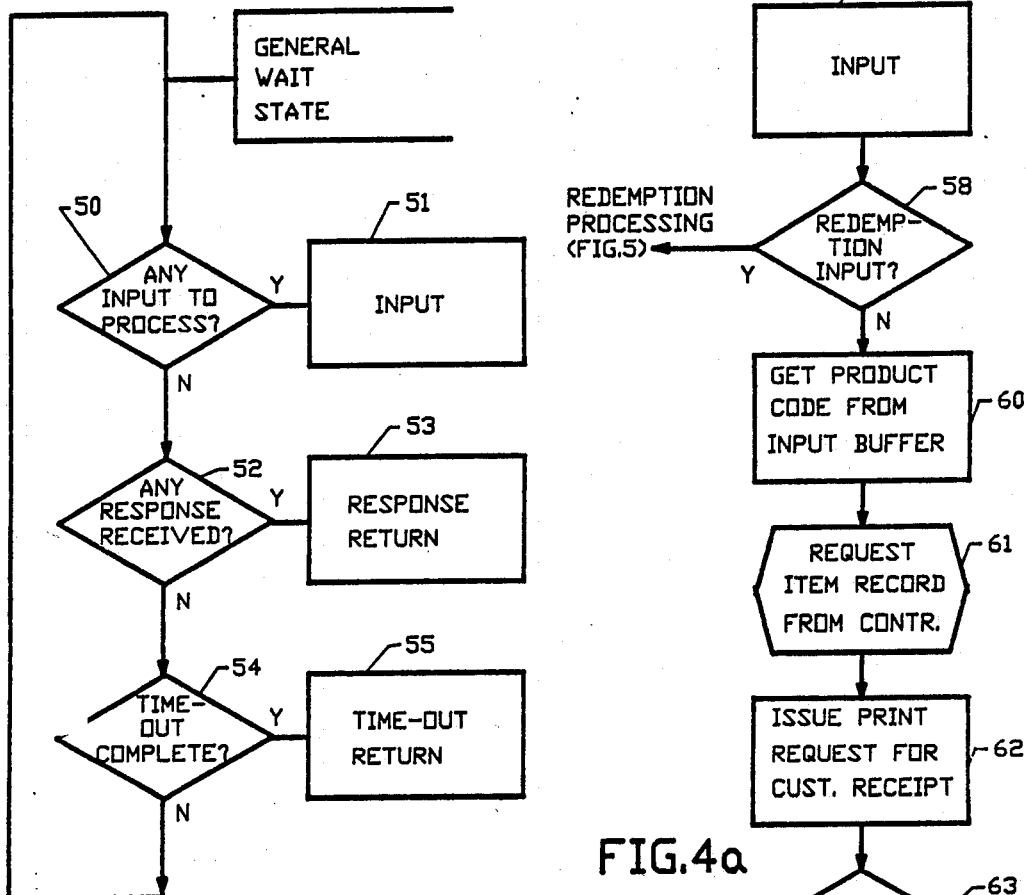
FIG. 3 is a simplified flow chart showing the functions performed in a general wait loop of the terminal program.
Figure 4A:
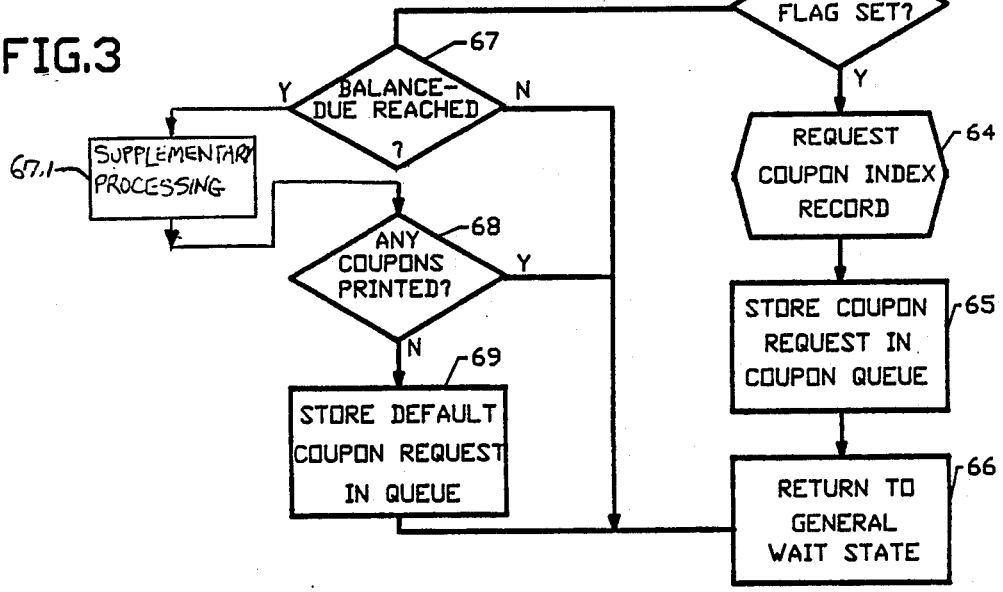
FIG. 4a is a simplified flow chart showing the functions performed at a checkout terminal during coupon creation.
Figure 4B:
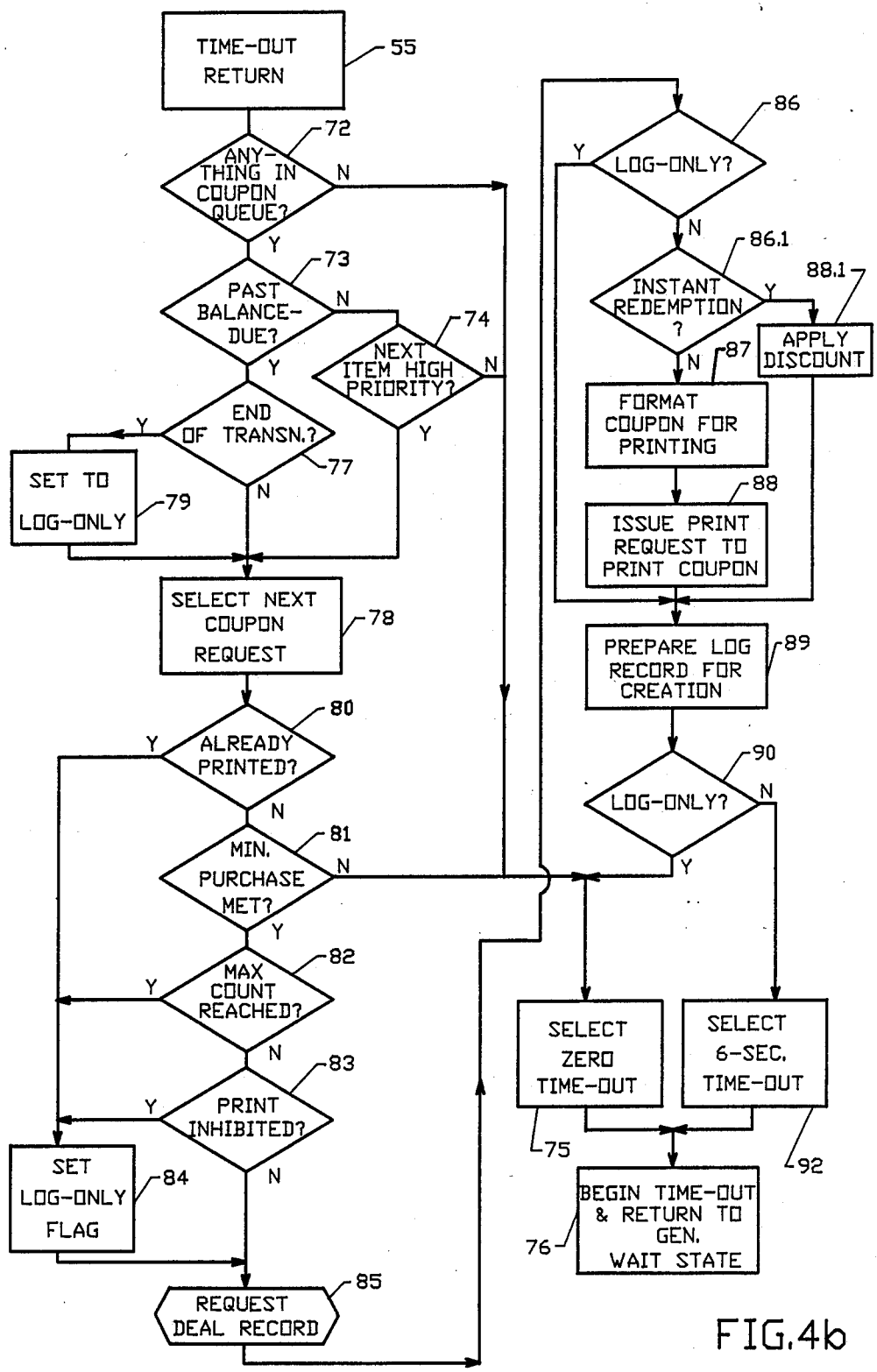
FIG. 4b is a simplified flow chart showing the functions performed in processing queued coupon printing requests during coupon creation.

The coupon creation functions performed by the terminals 12 and the controller 10 are shown in FIGS. 3, 4a and 4b. FIG. 3 illustrates a "general wait state" of the terminal, wherein the terminal software cyclicly checks to determine whether any processing is required. Once processing is initiated to a certain stage, a return is made to the general wait state, as will be further explained.

The first illustrated block of the general wait state poses the question whether there is any input data to process, as indicated at 50. The input data typically takes the form of bar code scanner input, but may also include keyboard input from the terminal operator. If there is input data to process, the terminal departs from the general wait state and enters an input program sequence, as indicated at 51. If there is currently no input data to process, the next test, posed in block 52, is whether a requested response has been received from the controller 10. As will be described, each of the terminals 12 frequently makes requests to the controller 10 for file access. The requesting program returns control to the general wait state, to await arrival of the response. If a response has been received, control is transferred to a response return point, as indicated at 53. The response return point sequentially follows the point in the program from which the file access request was made to the controller.

If no response has been received from the controller 10, the next question posed in the general wait state is whether a preselected time-out is complete, as indicated at 54. As will be described, a time-out is initiated after each coupon printing request, to ensure that the coupon printing function does not totally occupy the time of the terminal printer. In the equipment presently employed to implement the invention, coupons are printed at a separate station of the printer, but employing a print head shared by other print stations. In this manner, separate printed documents can be generated at the separate stations, but the single print head behaves in effect like a single printer. Printing of too many coupons can preclude or limit printing of a customer receipt. When the time-out is completed, return is made to the program that initiated the time-out, as indicated at 55. If the time-out is not yet complete, control is transferred back to the beginning of the general wait state loop.

In the input processing steps, shown in FIG. 4a, only the purchase and coupon creation functions are shown. If the input involves coupon redemption, as determined in block 58, control is transferred to the redemption processing functions illustrated in FIG. 5. Otherwise, the first step of input processing is to obtain the product code input to the terminal, as indicated in block 60. Then a request is made to the controller 10 for the item record corresponding to the input product code. The request for this record, indicated at 61, is one of a number of such requests made to the controller during the input process. In each case, after the request is transmitted to the controller 10, a return is made to the general wait state shown in FIG. 3, to await the return of the response from the controller. When the response is received, the wait state loop of FIG. 3 transfers control back to the input sequence, at a point immediately following block 61.

Next, as shown at 62, a print request is issued to initiate printing of a line on the customer receipt. The print request results in the storing of printable data in a print queue. One function of the system software associated with the terminal is to take printable information from the print queue on a first-in-first-out basis, and to print it using the terminal printer.

Up to this point in the input processing, the functions performed are conventional ones that take place regardless of whether any coupon creation is to occur. In the next step, shown at 63, a check is made to determine whether the trigger flag is set in the item record being processed. If the trigger flag is set, a request is made to the controller 10 for the corresponding coupon index record, as indicated at 64. If this is a normal triggering arrangement, as described in the cross-referenced application, the coupon look-up number, or numbers, stored in the coupon index record are placed as a coupon request in a coupon queue, as indicated at 65, together with the flags associated with each coupon look-up number in the coupon index record. If the item is one product in a multiple-trigger coupon deal, and is not also the subject of a separate normal triggering arrangement, the step of storing a coupon request in the coupon queue will be bypassed.

Regardless of whether this is a "normal" triggering product, or a "negative" coupon trigger, or one of multiple triggers, the occurrence of the triggering product is saved in trigger item list for this transaction, for use at the end of the transaction in processing the negative and multiple triggers.

One of the flags associated with the coupon index record is, of course, the printing priority flag, and this determines the position in which the coupon request will be placed in the coupon queue. High priority coupons are entered behind any already queued high-priority coupons and ahead of any low-priority items, while low-priority items are entered at the bottom or end of the coupon queue. After entry of a coupon request in the coupon queue, return is made to the general wait state, as indicated at 66.

If a product being processed has no coupon trigger flag, as determined in block 63, there is still a possibility that a coupon should be printed during the current transaction. The store has the option of printing a default coupon if no other coupons are printed in a transaction, and provided an optional minimum purchase requirement is met. Also, negative and multiple-trigger coupons have to be processed at the end of the transaction. First, a check is made, in block 67, to determine whether the transaction has advanced to the point where the balance due has been registered on the terminal, i.e. all items have been input and processed. If the balance-due point has not been reached, control is transferred to block 66, to return to the general wait state. If the balance-due point has been reached, control is next transferred to a supplementary processing program 67.1 illustrated in FIG. 4c. This supplementary processing program, to be discussed below, handles "negative" coupons and multiple-trigger coupons. When the supplementary processing is complete, return is made to block 68, which poses the question whether any coupons at all have been printed during the entire transaction. If not, a store default coupon is stored in the coupon queue, as indicated at block 69, before a return is made to the general wait state.

Input processing proceeds in the manner shown in FIG. 4a, with coupon requests being placed in the coupon queue as corresponding triggering items are detected in the transaction. The process by which coupon requests are removed from the coupon queue is shown in FIG. 4b.

Figures 4C, 4D:
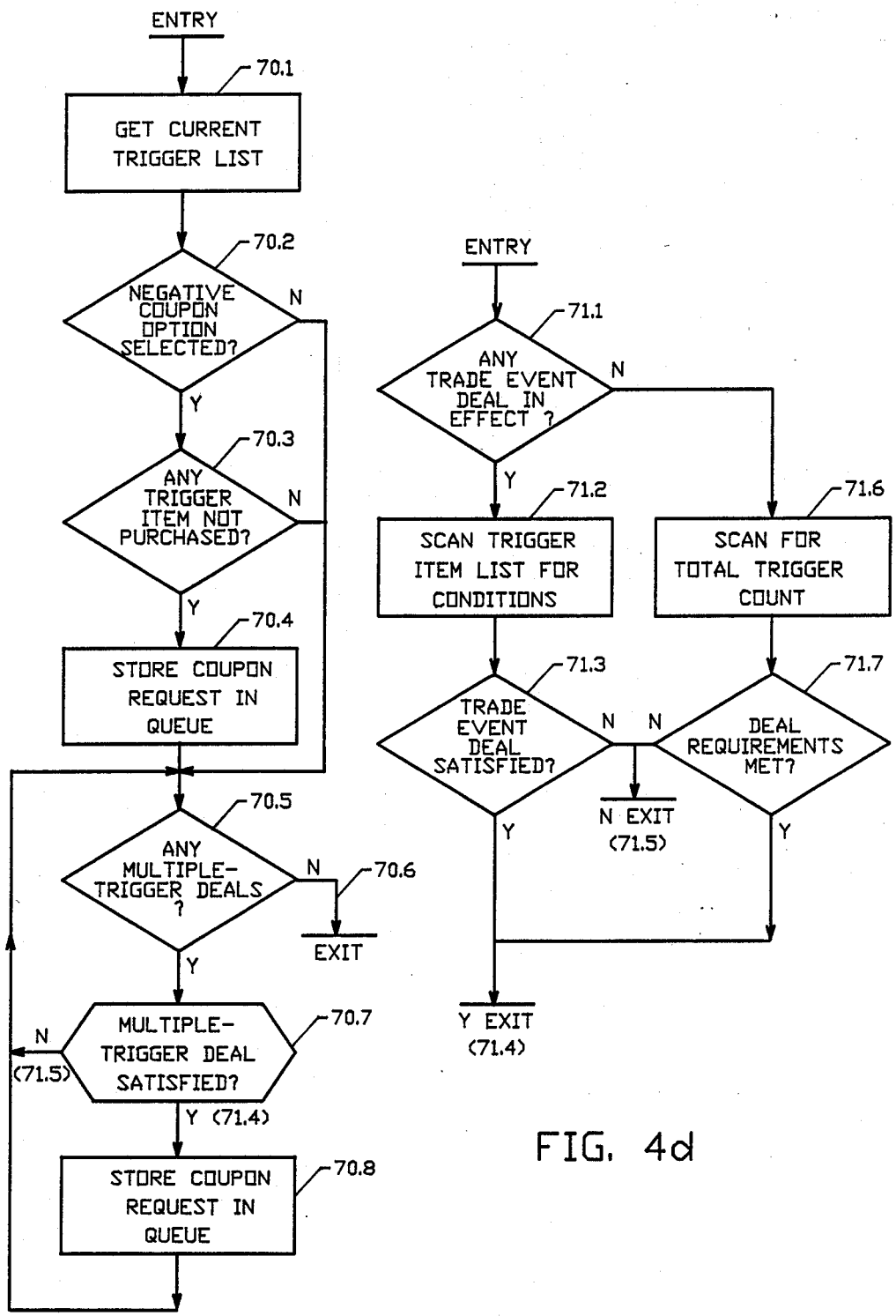
FIG. 4c is a simplified flow chart showing additional functions performed in input processing, to process "negative" coupon deals and multiple trigger item coupon deals.
FIG. 4d is a simplified flow chart showing the functions performed in FIG. 4c in determining whether multiple trigger coupon deals have been satisfied.

The supplementary processing of triggering items is shown functionally in FIG. 4c. First, as shown at block 70.1, access is obtained to a list of triggering items recorded for this particular transaction. Then the question is posed, as indicated in block 70.2, whether any negative coupon deal is in effect. If so, the list of triggering items is examined, in block 70.3, to determine whether any negative trigger item was not purchased in the transaction. The absence of a negative triggering item from the list results in the storing of a coupon request, in block 70.4. If no negative coupon deals are in effect, as determined in block 70.2, or if the terms of a negative trigger deal are not satisfied, as determined in block 70.3, or following the storing of a coupon request, in block 70.4, control is transferred to block 70.5, which determines whether there are any multiple-trigger deals in effect. If there are none, an exit is made from this processing program, as indicate at 70.6. If there is any multiple-trigger deal in effect, the terms of the deal are examined, as indicated in block 70.7, which is expanded in FIG. 4d. If the terms of the deal are satisfied, a coupon request is stored in the coupon queue, as shown in block 70.8 and control is transferred back to block 70.5 to check for additional multiple-trigger coupon deals. If the terms of the multiple-trigger coupon deal are not satisfied, block 70.8 is bypassed. It will be understood that there may be a number of multiple-trigger coupon deals in effect at the same time in a particular store. This will require multiple passes through the logic of FIG. 4c. In other words, exit from the processing program, at 70.6, is made only after returning to block 70.5 to determine whether any further multiple-trigger deals remain to be processed.

In determining whether the terms of a multiple-trigger deal have been satisfied, it is first determined, in block 71.1 (FIG. 4d), whether a trade event deal is in effect. If so, the trigger item list for this transaction is scanned for compliance with the deal conditions. A trade event deal may involve the purchase of any predefined number of items in a predefined trade group of products. If the terms of the trade event deal are satisfied, as indicated in block 71.3, the affirmative exit is taken from the processing program, as indicated at 71.4. If not, the negative exit from the program is taken, as indicated at 71.5. If no trade event deal is in effect, it is assumed that a simpler form of a multiple-trigger coupon is in effect. The trigger item list is scanned, in block 71.6, to accumulate a count of the number of trigger items purchased, or the total dollar amount purchased, as desired. If the requirements are met, as determined in block 71.7, the affirmative exit is taken (71.4). Otherwise, the negative exit (71.5) is taken.

After completion of input processing, as described with reference to FIGS. 4a, 4c and 4d, a return is always made to the general wait state, as indicated at 66 in FIG. 4a. Processing of the coupon queue proceeds in accordance with the flow chart of FIG. 4b. After a return from a time-out, from the general wait state, the coupon queue is first checked, as shown at 72, to determine whether there are any coupon requests waiting to be processed. If there are, the next question posed, in block 73, is whether the balance-due point has been reached in the transaction. If it has not, the only coupons eligible for printing are high priority coupons. This is determined in block 74. If there are no items in the coupon queue, or if there are only low-priority items and the balance-due point has not been reached, control is transferred to block 75, which selects a zero or near-zero time-out period. Then, in block 76, the time-out is initiated and a return is made to the general wait state. Control will very soon pass back again from the general wait state, to check the condition of the coupon queue once more.

If the balance-due point has been reached, as determined in block 73, the next test, in block 77, is to determine whether the end of the transaction has been reached, that is whether the terminal operator has received payment for the sale and has closed out the transaction in preparation for beginning a new one. If this has not occurred, control is passed to the next step, at block 78, to select the next unprocessed item in the coupon queue. If the end of the transaction has been reached, however, a log-only flag is set, in block 79, before passing to block 78. Control also passes to block 78 if a high priority coupon creation request is detected in block 74.

At this point, a coupon creation candidate has been selected from the coupon queue, but it is still subject to a number of further tests before an actual print request is made to print the coupon. First, in block 80, a check is made to determine if the same coupon has already been printed in this transaction. Only one coupon of the same coupon look-up number is normally permitted for each transaction. Next, if there have been no previous coupons of the same kind, a check is made in block 81 to determine whether a minimum purchase threshold has been reached. For each coupon deal, there is an option to prevent printing of the coupon if a designated (store-wide) total purchase minimum is not reached. If the answer obtained from block 81 is negative, control is transferred to block 75, to exit to the general wait state, but without removing the coupon request from the coupon queue. The next time the coupon is processed, the total purchase amount is again checked. If the coupon is never printed, because the threshold purchase amount is not reached by the end of the transaction, a log record is created for the coupon.

In block 82, a check is made on the total count of coupons printed for this transaction. If the number exceeds a maximum set for this particular checkout terminal, no further printing of coupons is permitted. In addition, printing is permitted if a print inhibit flag has been set, as determined in block 83. If printing is inhibited, or if the maximum coupon count is reached, or if the coupon has been printed already, then the log-only flag is set, as indicated in block 84, before advancing to the step shown in block 85, in which the complete coupon deal record, corresponding to the currently processed coupon queue entry, is requested from the controller 10.

Next, if the log-only flag is not set, as determined in block 86, a determination is made, in block 86.1, whether the coupon deal calls for an instant redemption, i.e. the application of a discount without the printing of a coupon. If no instant redemption is called for, the coupon is formatted for printing, as indicated in block 87, using the information obtained from the coupon deal record. Then a print request is issued, as indicated in block 88, to place in the print queue the printable data that is to appear on the coupon. This data will include bar code data that will result in the printing of a coupon with pertinent information encoded in barcode form. If instant redemption is called for, as determined in block 86.1, a discount is applied directly to the customer bill, as indicated in block 88.1, and blocks 87 and 88 are bypassed to avoid printing a coupon. The amount of the discount may depend on the number of trigger items (in multiple- trigger coupon deals) or on other factors predefined for the coupon deal.

The next step, shown at block 89, is to prepare a log record of the coupon creation, or in the case of log-only situations, to create a log record of a coupon request that did not result in printing of a coupon. The log-only flag is checked again in block 90, after the logging step of block 89. If the log-only flag is set, control is transferred to block 75, to set a zero time-out and then to return to the general wait state. If the log-only flag is not set, i.e., a coupon is to be printed, a six-second delay or time-out is selected, in block 92, before returning to the general wait state through block 76. The time-out ensures that the printer will not be totally occupied with the coupon printing function, but will be free for at least the next six seconds to print other material, such as portions of the customer receipt.

An important aspect of coupon creation is that one of the fields printed on the coupon in bar code form is a trigger item sequence number, obtained from the coupon index record flags. This number identifies the triggering product or item, and can be used to compile statistics relating the printed coupon to the items that triggered its printing. The other fields of data printed on the coupon in bar code form include the coupon value, the expiration date, the manufacturer's code, and the product family code to which the coupon deal applies. Printed on the coupon in human-readable form are the offer description and the advertising message, as well as some of the information also printed in bar code form.

Coupon Validation and Redemption

Figure 5:
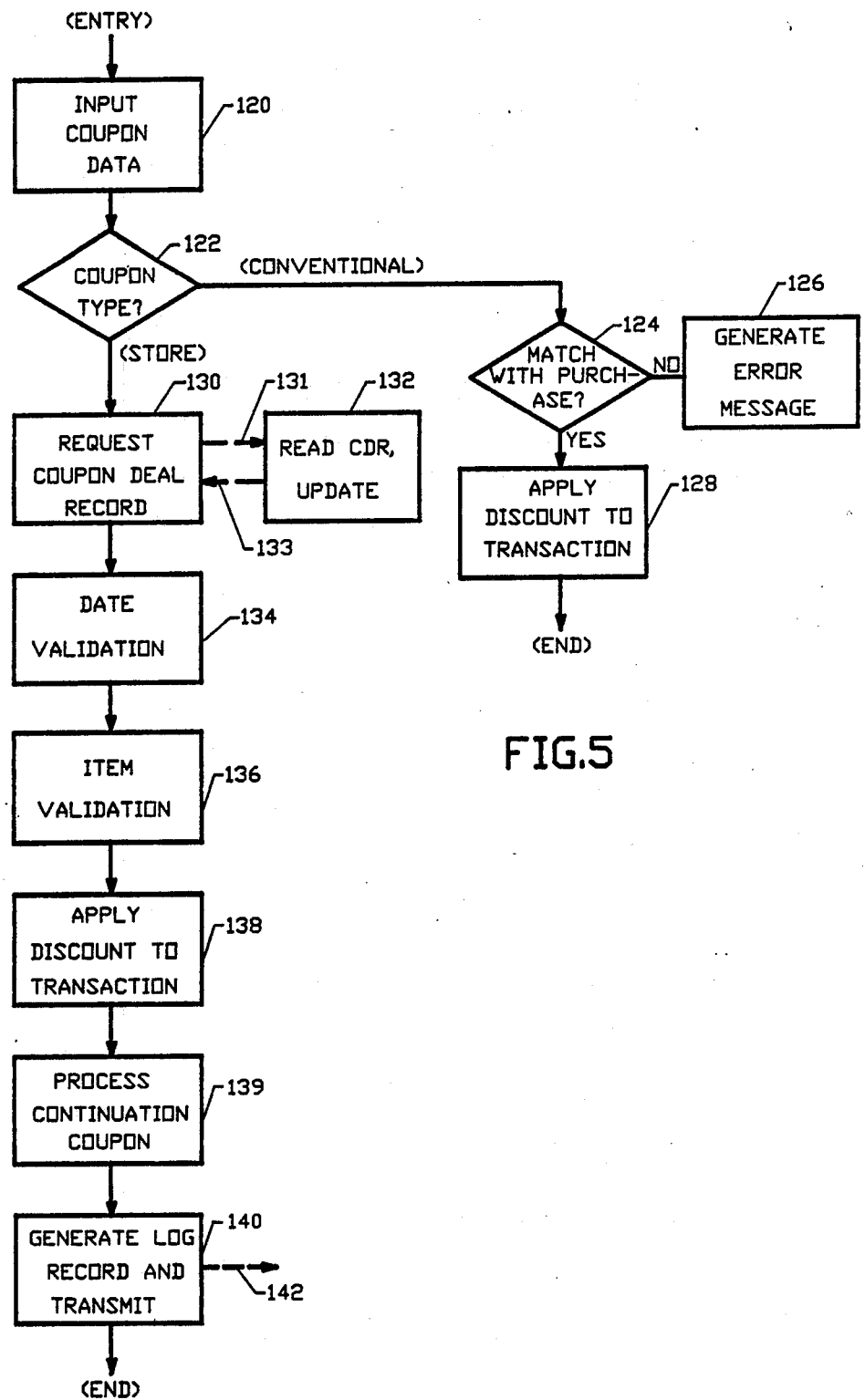
FIG. 5 is a simplified flow chart showing the functions performed by the store controller and a terminal during coupon redemption.

When a store-printed coupon is presented for redemption, it must first be validated both with respect both to the date of its presentation and the product for which it is presented. FIG. 5 shows the functions that are performed during the validation phase. First, at block 120, coupon data is input at a terminal. The coupon may be one that was created at the store in accordance with the procedures described, or it may be a conventional coupon. This determination is made in block 122. Conventional coupons, which may be identified as a Number System 5 coupon in accordance with Uniform Product Code guidelines, are handled by first determining whether an item with the same family group code and manufacturer code has been sold in this transaction, as indicated in block 124. If no match is found, an error message is transmitted to the controller, as indicated in block 126. If a match is found, the appropriate discount is applied to the customer transaction, as shown in block 128.

Of more significance to the invention is the treatment of coupons that were printed in the store as described above. Such coupons are identified as number System 4 coupons in block 122. The terminal makes a request to the controller for a coupon deal record, based on the coupon look-up number encoded on the coupon. This is indicated in block 130 and broken line 131. The controller then reads the appropriate coupon deal record from its coupon look-up file, updates the counts in the record, as indicated in block message is returned to the terminal and the coupon is rejected as invalid.

Next, the terminal validates the date of presentation of the coupon, as indicated in block 134. This logic being expanded in FIG. 6. Then, the terminal validates the coupon with respect to the item for which a discount is requested, as shown in block 136 and FIG. 7, and applies the discount to the customer's transaction, as shown in block 138.

An important step in validation processing is to check coupon deal record to determine if a "continuation" coupon is associated with this particular deal. A continuation coupon is one generated as a result of the redemption of another coupon. This process step is indicated in block 139. If a continuation coupon is to be created, a coupon request is entered in the coupon queue at this point. The coupon is generated in its turn by the program sequence shown in FIG. 4b. Finally, the terminal creates a log record, in block 140, and transmits it to the controller, as indicated by broken line 142.

Figure 6:
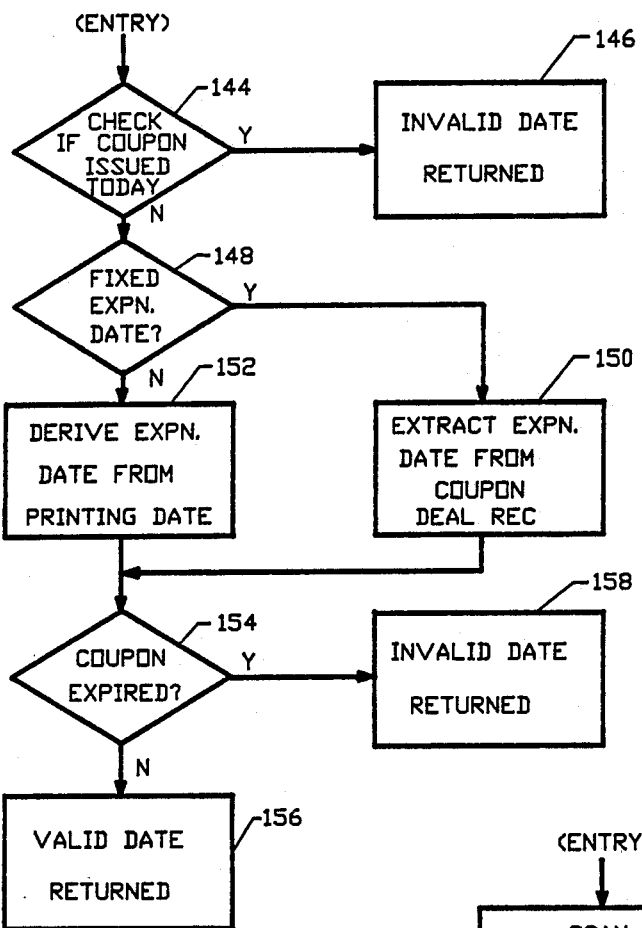
FIG. 6 is a simplified flow chart showing date validation functions of FIG. 5.

The details of date validation are shown in FIG. 6. The first question posed in this logic is whether the coupon date is equal to the current day's date, as shown in block 144. If the dates are equal, an invalid date is indicated, as shown at 146. Although not critical to the invention, this aspect of the date validation is usually desirable, to encourage the customer to return to the store to redeem the coupon.

The next test in the date validation sequence is to determine whether the expiration date is a fixed one or is determined from the date of coupon printing. This is shown in block 14 8 . If a fixed expiration date is used, the expiration date is obtained from the coupon deal record, as indicated at 150. On the other hand, if the expiration date is coupon-dependent, the expiration date is determined from the coupon date and the validity period stored in the coupon deal record, as indicated in block 152. Finally, in block 154 the current date is subtracted from the expiration date and the validity of the coupon is determined. Return to the calling program sequence is made with an accept or reject flag to indicate the validity of the coupon date, as indicated at 156 and 158.

Figure 7:
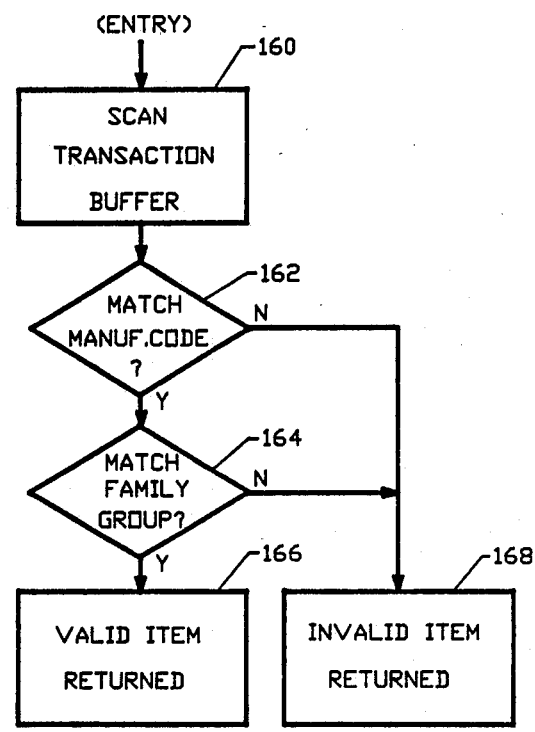
FIG. 7 is a simplified flow chart showing item validation functions of FIG. 5.

Item validity of a coupon is determined as shown in FIG. 7 by first scanning a transaction buffer in the terminal, as indicated at 160. The transaction buffer contains a record of all purchased items in the transaction. For each item purchased, a comparison is made between the manufacturer's code, as indicated at 162, and family group code, as indicated at 164 in the coupon deal record and the corresponding fields in the transaction buffer. If a match is found, the item validation results in acceptance of the coupon, as indicated at 166, and if no match results the coupon is rejected, as indicated at 168.

File Maintenance

Maintenance of the controller files used in coupon creation and redemption is effected by means of a sequential maintenance file, which may be prepared at a site remote from the store, and then processed at the store controller to effect the desired changes in the files.

The maintenance functions include adding, deleting or replacing coupon deal records and coupon index records, enabling and disabling coupon triggering by item, enabling and disabling coupon printing by item, copying the coupon by file, and retrieving the coupon counts. Other functions include reorganizing the coupon-look-up file, clearing the file before a reload, and adding or replacing system configuration data. The latter function includes enabling or disabling coupon creation by coupon deal, enabling or disabling printing by store or checkout lane, enabling or disabling triggering by store or checkout lane, enabling or disabling coupon validation but continuing to log redemptions and misredemptions, updating a per-transaction coupon maximum, by checkout lane, and updating a transaction threshold.

The format of the maintenance file is as follows:

Command 1 (one byte)
Data
...
Data
Data
End-of-data record
Command 2
Data
...
...
End-of-data record
...
...
End-of-document record Four commands do not require accompanying data. These are commands to reorganize the coupon look-up file, create a report log, report all coupon counts, and clear the coupon look-up file for a reload.

The specific formats for effecting these maintenance commands is not critical to the present invention. Any desired programming approach may be employed to make changes to the controller files as desired.

It will be appreciated from the foregoing that the present invention represents a significant advance in the field of retail point-of-sale systems. In particular, the invention provides a new approach for distributing discount coupons to retail customers, and involves improvements over the basic invention defined in the cross-referenced application. Among these improvements are the printing of "negative" coupons in response to the non-purchase of a triggering item, the printing of coupons in response to the purchase of multiple triggering items, either without limitation or falling into predefined trade groups. Instant discounts can be provided instead of printing a coupon, and, finally, the log-only function can be applied to any of the types of coupon discount deals described.

It will also be appreciated that, although a specific embodiment of the invention has been described in detail for purposes of illustration, various modifications may be made without departing from the spirit and scope of the invention. Accordingly, the invention is not to be limited except as by the appended claims.

We claim:

1. A system for simulating the printing of a redeemable coupon in a retail store, solely in response to the purchase of a triggering item, to record the effect of a specific discount coupon deal without actually printing the coupons, the system comprising:

a plurality of terminals at customer checkout locations, each having means for reading product codes on purchased items in a customer order;
a store controller with which the terminals can communicate, the store controller having access to an item record file containing price and other information for each product item;
means for storing the terms of at least one coupon deal in which the generation of a printable discount coupon for a selected product will be triggered by the purchase of a triggering product;
means for identifying the triggering product in the customer order;
means for associating the triggering product with the coupon deal; and
means for automatically logging, but not printing, the generation of at least one discount coupon for a product other than the triggering product, based on the details of the coupon deal and without the intervention or participation of the customer other than in purchasing the triggering product, whereby statistics relative to the coupon deal can be gathered without actually printing the discount coupons.

2. For use in a retail store point-of-sale system having a plurality of terminals at customer checkout locations, each with means for reading product codes on purchased items in a customer order, and a store controller with which the terminals can communicate, the store controller having access to an item record file containing price and other information for each product item, a method for logging (without printing) the generation of a printable discount coupon solely in response to the purchase of a item, the method comprising the steps of:

preselecting a discountable product for which a discount coupon is to be generated;
preselecting at least one triggering product, the purchase of which is intended to initiate generating of the discount coupon;
storing the terms of at least one coupon deal relating to the discount coupon to be generated;
identifying the triggering product in the customer order;
associating the triggering product with the previously stored terms of the coupon deal; and
automatically logging, but not printing, the generation of at least one discount coupon for the discountable product, based on the details of the coupon deal and without the intervention or participation of the customer other than in purchasing the triggering product.

3. A system for generating a printable discount coupon in a retail store, solely in response to the purchase of an item, the system comprising:

a plurality of terminals at customer checkout locations, each having means for reading product codes on purchased items in a customer order;
a store controller with which the terminals can communicate, the store controller having access to an item record file containing price and other information for each product item;
means for storing the terms of at least one coupon deal in which the generation of a discount coupon for a selected product from one supplier will be triggered by the purchase of a triggering product from a different supplier;
means for identifying the triggering product in the customer order;

means for associating the triggering product with the coupon deal; and means for automatically generating at least one printable discount coupon for a product other than the triggering product, based on the details of the coupon deal and without the intervention or participation of the customer other than in purchasing the triggering product.

4. For use in a retail store point-of-sale system having a plurality of terminals at customer checkout locations, each with means for reading product codes on purchase items in a customer order, and a store controller with which the terminals can communicate, the store controller having access to an item record file containing price and other information for each product item, a method for generating a printable discount coupon solely in response to the purchase of an item, the method comprising the steps of:

preselecting a discountable product for which a discount coupon is to be generated;

preselecting at least one triggering product from one supplier, the purchase of which is intended to initiate generation of the discount coupon for a product from a different supplier;

storing the terms of at least one coupon deal relating to the discount coupon to be generated;

identifying the triggering product in the customer order;

associating the triggering product with the previously stored terms of the coupon deal; and automatically generating at least one printable discount coupon for the discountable product, based on the details of the coupon deal and without the intervention or participation of the customer other than in purchasing the triggering product.

* * * * *